United States Patent
Arita et al.

(10) Patent No.: US 7,414,343 B2
(45) Date of Patent: Aug. 19, 2008

(54) HYBRID-EXCITED ROTATING MACHINE, AND VEHICLE WITH THE HYBRID-EXCITED ROTATING MACHINE

(75) Inventors: Hideaki Arita, Tokyo (JP); Masaya Inoue, Tokyo (JP); Yoshihito Asao, Tokyo (JP); Tsunenobu Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/521,474

(22) Filed: Sep. 15, 2006

(65) Prior Publication Data

US 2007/0090713 A1    Apr. 26, 2007

(30) Foreign Application Priority Data

Oct. 26, 2005   (JP)   ............................. 2005-311142

(51) Int. Cl.
  *H02K 3/00*   (2006.01)
(52) U.S. Cl. .................. 310/181; 310/156.53; 310/191; 310/156.49
(58) Field of Classification Search ................. 310/181, 310/156.53, 191, 186, 156.49
  See application file for complete search history.

(56) References Cited

U.S. PATENT DOCUMENTS

| | | | |
|---|---|---|---|
| 5,663,605 A * | 9/1997 | Evans et al. .................. 310/181 |
| 5,719,486 A * | 2/1998 | Taniguchi et al. .............. 322/28 |
| 5,753,989 A | 5/1998 | Syverson et al. |
| 5,942,829 A * | 8/1999 | Huynh ........................ 310/178 |
| 6,147,429 A | 11/2000 | Akemakou et al. |
| 6,548,931 B2 * | 4/2003 | Liang et al. ............. 310/156.07 |
| 6,756,870 B2 * | 6/2004 | Kuwahara .................... 335/224 |
| 6,853,112 B2 * | 2/2005 | Nakamura et al. .......... 310/263 |
| 2005/0001503 A1 * | 1/2005 | Hans ..................... 310/156.53 |

FOREIGN PATENT DOCUMENTS

JP   11-289732 A   10/1999
JP   2000-517150 A   12/2000

\* cited by examiner

*Primary Examiner*—Darren Schuberg
*Assistant Examiner*—Alex W Mok
(74) *Attorney, Agent, or Firm*—Sughrue Mion, PLLC

(57) ABSTRACT

A hybrid-excited rotating machine comprising: a stator winding of a multi-phase Y-connection; a plurality of rotor magnetic poles fixed on a rotor shaft 3 at a predetermined spacing in the circumferential direction and confronting the inner circumference of said stator through a air gap; a plurality of permanent magnets fixed at substantially central portions of said circumferential direction of said individual rotor magnetic poles and magnetized in the radial direction of said rotor shaft; and a plurality of field windings wound individually on said rotor magnetic poles.

8 Claims, 10 Drawing Sheets

HYBRID-EXCITED ROTATING MACHINE, AND VEHICLE WITH THE HYBRID-EXCITED ROTATING MACHINE

BACKGROUND OF THE INVENTION

1. Field of the Invention

The present invention relates to a rotating machine for a vehicle or the like, which is equipped at its rotor with permanent magnets and field windings so that it is excited in a hybrid manner by the permanent magnets and the field windings, and to a vehicle which is equipped with the hybrid-excited rotating machine.

2. Background Art

The rotating machine having permanent magnets at its rotor is advantageous in that it is small but can generate a high torque, and is adopted in recent years for various applications. However, it fixes the quantity of magnetic flux that the rotor has the magnets. In case this rotating machine is employed as a generator, therefore, its output voltage is proportional to the revolving speed so that it widely changes in the application where the revolving speed range is wide as in a vehicular generator. Thus, it is difficult to apply the rotating machine to a vehicular generator, which is required to have its power generation controlled at a constant voltage such as 14 [V], for example.

As the vehicular generator of the prior art, therefore, there has been generally spread the so-called Rundell type synchronous machine, which is enabled to control the quantity of magnetic flux with the controling exciting current to the field winding of claw pole.

On the other hand, it has been conceived to acquire an idling stop function by connecting a semiconductor switching element with a vehicular generator and by using the generator as a starting motor. In case, however, the vehicular generator of the prior art is used as the starting motor, the starting torque is short for restarting the engine instantaneously. In order to enlarge that starting torque, it is conceivable to enlarge the size of the rotating machine. Because of the apprehension that claw-shaped pole is deformed by the centrifugel force, it is difficult to manufacture the rotating machine of a large size.

As another example of the prior art, therefore, it has been proposed to apply a hybrid-excited rotating machine, which has a revolving field for causing both the excitation by the field windings energized by a slip ring and a permanent magnet excitation, to a vehicular motor-generator. (Refer to JP-A-11-289732, for example).

The rotating machine of Patent JP-A-11-289732 is constituted, like the vehicular generator of the prior art having the general claw-shaped magnetic poles, to increase/decrease the magnetic flux linkage with the stator winding by energizing the field windings.

SUMMARY OF THE INVENTION

For an instantaneous start of the engine, it has been desired to improve the starting torque better. In order to have a higher torque in the device of the prior art, the permanent magnets have to be enlarged to increase total magnetic flux. As a result, the starting torque is improved, but the induced voltage at a no-load time rises. Even if the main magnetic flux is minimized, the voltage exceeds the supply voltage of the vehicle so that the power generation cannot be controlled. It is then conceivable to invert the field current thereby to weaken the main magnetic flux. In the magnet arrangement of the rotating machine of the prior art, the inverse excitation is done with the practically possible field current. However, it is difficult to weaken the main magnetic flux to a low voltage corresponding to that of car-mounted power source.

In the constitution of the conventional device, on the other hand, even if the fundamental wave components of the permanent magnetic flux could be completely weakened by the inverse excitation of the field windings, the higher harmonic components of the voltage would be left to raise the induced voltage exceeding the voltage of the car-mounted power source. This is because the magnetic flux waveforms formed by the field windings and the magnetic flux waveforms generated by the permanent magnets are different to have different higher harmonic components.

From the background thus far described, the rotating machine of the prior art has a problem that it is difficult to make compatible the increase in the starting torque and the suppression of no-load voltage by the field.

An object of the invention is to solve the problems of the device of the prior art thus far described, and to provide a hybrid-excited rotating machine, which can make compatible the increase in the starting torque and the suppression of no-load voltage by the field, and a vehicle provided with the hybrid-excited rotating machine.

According to the invention, there is provided a hybrid-excited rotating machine comprising: a stator having a stator winding of a multi-phase Y-connection; a plurality of rotor magnetic poles fixed on a rotor shaft at a predetermined spacing in the circumferential direction and confronting the inner circumference of said stator through a air gap; a plurality of permanent magnets fixed at substantially central portions of said circumferential direction of said individual rotor magnetic poles and magnetized in the radial direction of said rotor shaft; and a plurality of field windings wound individually on said rotor magnetic poles. In this invention, the multi-phase means the phase of three or more phases.

In a hybrid-excited rotating machine according to the invention, said permanent magnets are buried in said rotor magnetic poles.

In a hybrid-excited rotating machine according to the invention, said permanent magnets are inserted in grooves formed in said rotor magnetic poles and have their surfaces exposed to said air gap.

A hybrid-excited rotating machine according to the invention further comprises inter-pole permanent magnets interposed between said individual rotor magnetic poles and magnetized in said circumferential direction.

In a hybrid-excited rotating machine according to the invention, said stator winding is a fractional-pitch winding having a winding pitch as short as 84% of a pole pitch.

In a hybrid-excited rotating machine according to the invention, said stator winding is made of a three-phase or six-phase Y-connection winding, wherein said rotor magnetic poles have at least eight poles, and wherein said permanent magnets are made of a material containing rare earth elements.

In a hybrid-excited rotating machine according to the invention, said stator winding is connected at its neutral point with a battery through a semiconductor element.

According to the invention, moreover, there is provided a vehicle comprising a hybrid-excited rotating machine thus constituted, in which said hybrid-excited rotating machine is used as a generator to be driven by an engine of a vehicle and as an engine starting motor for starting said engine.

According to the invention, the hybrid-excited rotating machine comprises: a stator having a stator winding of a multi-phase Y-connection; a plurality of rotor magnetic poles fixed on a rotor shaft at a predetermined spacing in the circumferential direction and confronting the inner circumference of the stator through a air gap; a plurality of permanent magnets fixed at substantially central portions of the circumferential direction of the individual rotor magnetic poles and magnetized in the radial direction of the rotor shaft; and a plurality of field windings wound individually on the rotor magnetic poles. As a result, the center portion of the rotor magnetic poles can be given a higher magnetic flux density by the magnetic flux of the permanent magnets, and any high magnetomotive force is not needed because the field windings may control the magnetic fluxes at the two end portions of the rotor magnetic poles. It is possible to provide a hybrid-excited rotating machine, which can make compatible the increase in the starting torque and the suppression of no-load voltage by the weakened field.

In the hybrid-excited rotating machine according to the invention, the permanent magnets are buried in the rotor magnetic poles. The iron core of the rotor magnetic poles is positioned on the magnet surface on the air gap side so that the weakened field effect becomes better to suppress no load voltage at the high-speed run as the generator and to facilitate the high-speed run itself.

In the hybrid-excited rotating machine according to the invention, the permanent magnets are inserted in grooves formed in the rotor magnetic poles and have their surfaces exposed to the air gap. The air gap side is the magnet surface so that the leakage of the magnetic flux can be reduced to establish a higher torque.

The hybrid-excited rotating machine according to the invention further comprises inter-pole permanent magnets interposed between the individual rotor magnetic poles and magnetized in the circumferential direction of the rotor shaft. The magnetic saturation on the inner circumference side of the rotor can be reduced to increase the effective main magnetic flux thereby to generate a higher torque.

In the hybrid-excited rotating machine according to the invention, the stator winding is a fractional-pitch winding having a winding pitch as short as 84% of a pole pitch. The higher harmonic waves, i.e., relatively high fifth higher harmonic waves can be reduced to lower the no-load induced voltage.

In the hybrid-excited rotating machine according to the invention, the stator winding is made of a three-phase or six-phase Y-connection winding; wherein the rotor magnetic poles have at least eight poles, and wherein the permanent magnets are made of a material containing rare earth elements. By the multi-polarization and by the adoption of the permanent magnets made of the material containing rare earth elements, the higher starting torque can be achieved, and the demagnetization is hardly caused even by the weakening magnetization in the inverse excitation of the field windings, so that the power generation of a large output can be performed over a wide revolving speed range.

In the hybrid-excited rotating machine according to the invention, the stator winding is connected at its neutral point with a battery through a semiconductor element. At a high-speed rotation, therefore, the saturation of the power generating performance can be relaxed to produce a high output.

According to the invention, moreover, the vehicle comprises a hybrid-excited rotating machine thus constituted, in which the hybrid-excited rotating machine is used as a generator to be driven by an engine of a vehicle and as an engine starting motor for starting the engine. Therefore, it is possible to provide a vehicle having the rotating machine which can start the engine quickly from the idling stop and which generate an electric power of a large output over a wide revolving speed range after the engine was started.

DESCRIPTION OF THE PREFERRED EMBODIMENTS

Mode of Embodiment 1

Figure 1:
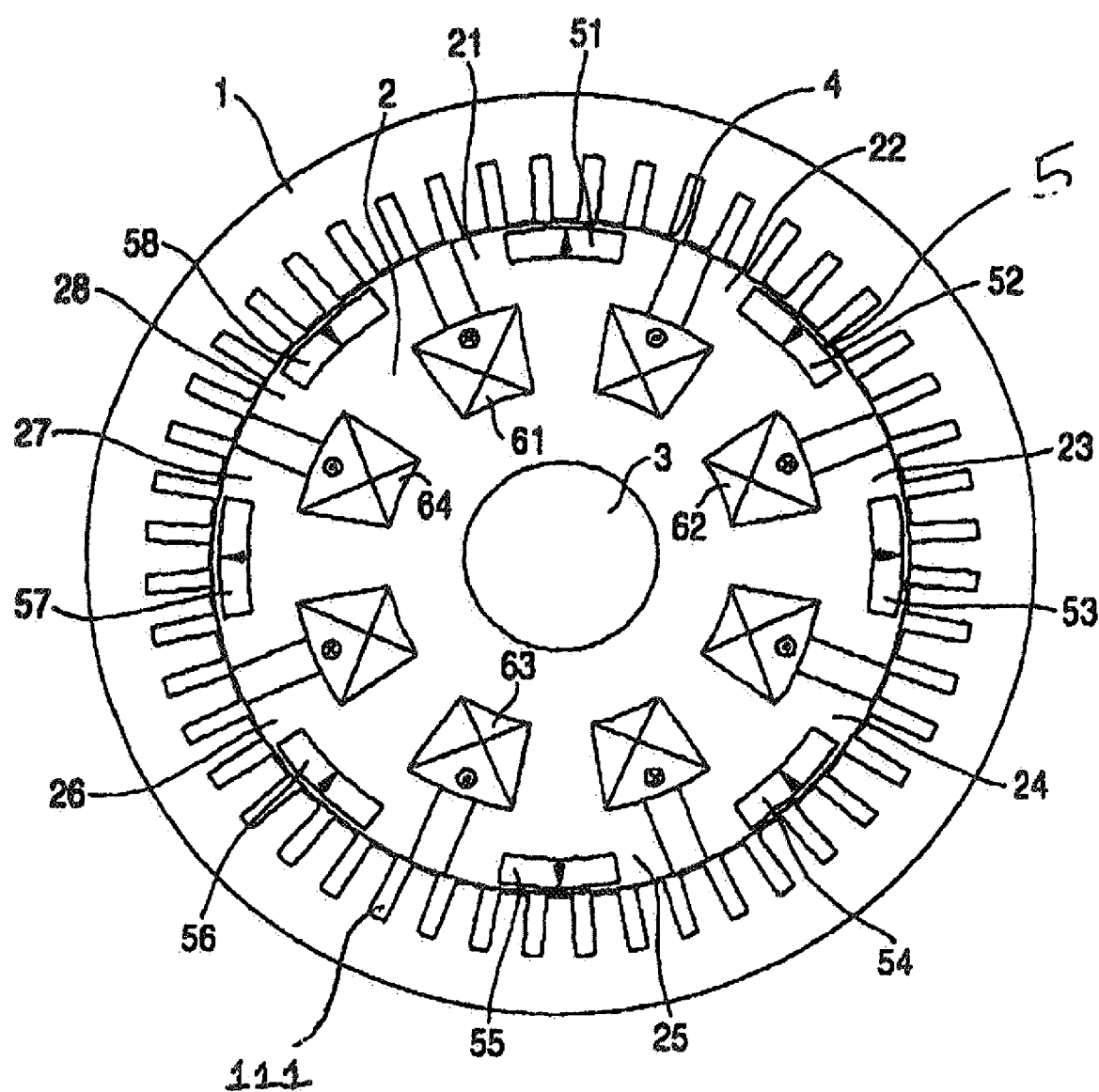
FIG. 1 is a transverse section of a hybrid-excited rotating machine according to Mode of Embodiment 1 of the invention.
Figure 2:
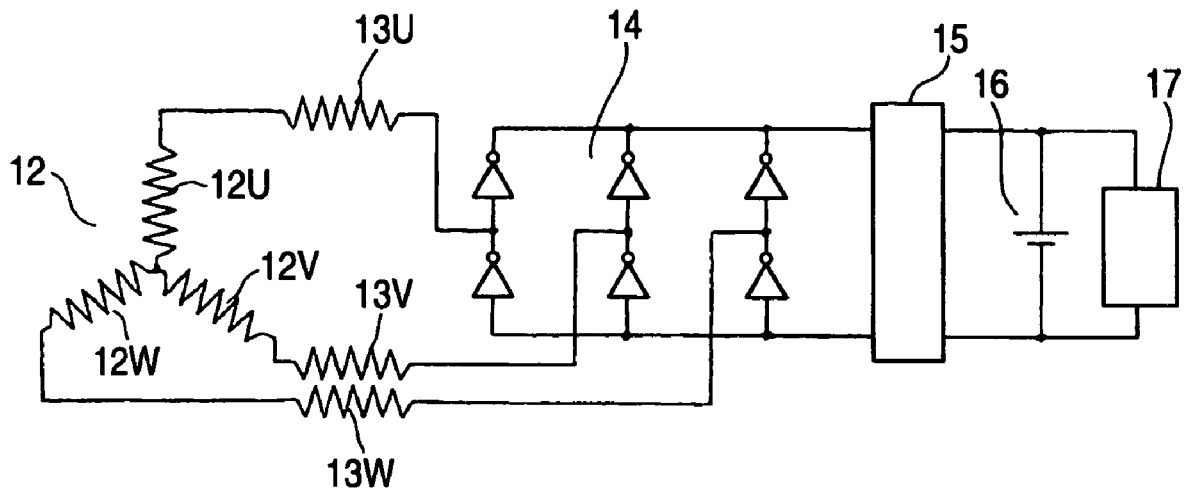
FIG. 2 is an explanatory diagram showing the circuit of the stator winding of the hybrid-excited rotating machine according to Mode of Embodiment 1 of the invention.

FIG. 1 is a transverse section of a hybrid-excited rotating machine for a vehicle according to Mode of Embodiment 1 of the invention, and FIG. 2 is an explanatory diagram showing the circuit of a stator winding. In FIG. 1, a stator 1 is equipped with stator iron core 11, in which annular magnetic sheets of an identical shape are laminated in the axial direction. Forty eight slots 111 are formed in the inner circumference of that stator iron core 11. In the forty eight slots 111 of the stator iron core 11, although not shown in FIG. 1, a stator winding 12 having a three-phase Y-connection is mounted as a distributed winding of an every-pole/every-phase 2. Here, the stator winding 12 may be a concentrated winding.

FIG. 2 shows a constitution relating to the stator winding 12, which is equipped with a U-phase winding 12U, a V-phase winding 12V and a W-phase winding 12W of the three-phase Y-connection, as described above. The U-phase winding 12U, the V-phase winding 12V and the W-phase winding 12W are connected through smoothing reactors 13U, 13V and 13W, respectively, to the input terminal of a power converter 14 made of a semiconductor element. This power converter 14 is connected through a voltage regulator 15 with a battery 16 and a load 17. (However, smoothing reactors 13U, 13V and 13W are not indispensable.)

When the hybrid-excited rotating machine is used as a generator, the power converter 14 acts as a converter to convert the three-phase power generated by the stator winding 12, into a DC power. When the hybrid-excited rotating machine is used as an engine starting motor, the power converter 14 acts as an inverter to convert the DC power from the battery 16 into the three-phase AC power and to feed the converted power to the stator winding 12.

A rotor 2 is equipped with eight rotor magnetic poles 21, 22, 23, 24, 25, 26, 27 and 28, which are fixed on the circumference of the rotor shaft 3 through a clearance of a mechanical angle of 45 degrees. These rotor magnetic poles 21 to 28 are made of iron cores having a number of magnetic sheets laminated in the axial direction, and are formed to have a generally T-shaped section orthogonal to the axis. The rotor magnetic poles 21 to 28 are arranged to confront the inner circumference of the stator iron core 11 through a air gap 4.

Generally at the central portions of the individual rotor magnetic poles 21 to 28 and new the air gap 4, there are buried permanent magnets 51, 52, 53, 54, 55, 56, 57 and 58. These permanent magnets 51 to 58 are magnetized in the radial direction of the rotor 2. The arrows in FIG. 1 are directed to indicate the N-pole sides of the individual permanent magnets 51 to 58, which are arranged to have their polarities alternately inverted. These permanent magnets 51 to 58 are made of rare earth elements such as neodymium or samarium so that they can generate stronger magnetic fluxes.

On the bases of the individual rotor magnetic poles 21 to 28, there are wound annular field windings 61, 62, 63 and 64, which are fed from the outside with field currents through the not-shown slip rings so that they are energized in the shown direction.

Figure 3:
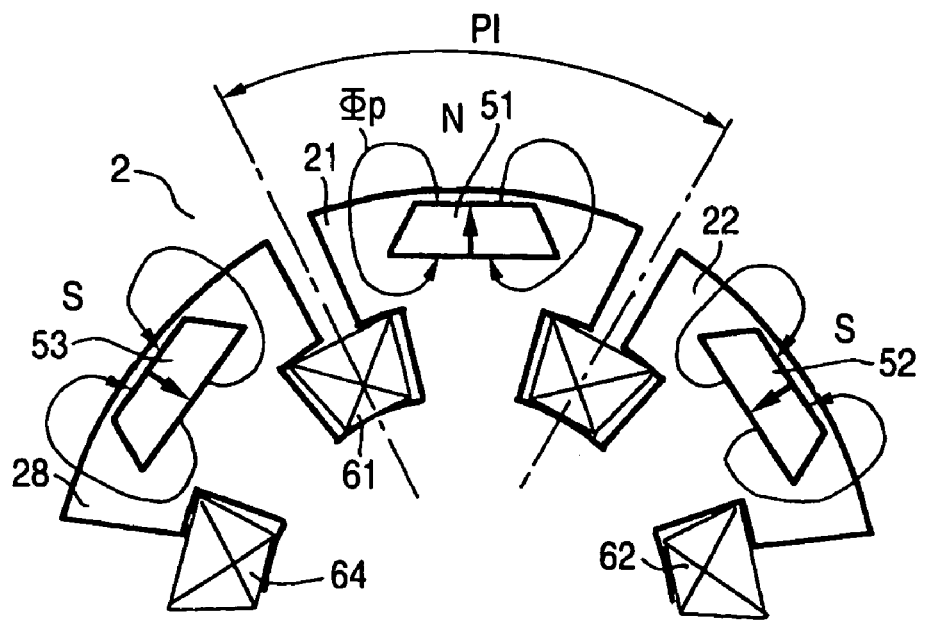
FIG. 3 is an explanatory diagram for explaining the hybrid-excited rotating machine according to Mode of Embodiment 1 of the invention.

In the hybrid-excited rotating machine thus constructed according to Mode of Embodiment 1 of this invention, the magnetic poles are established by magnetic fluxes Φp by the permanent magnets 51 to 58, in case field windings 61 to 64 are not energized, as shown in the explanatory view of FIG. 3. In this case, the adjoining permanent magnets 51 to 58 are alternately magnetized in the reverse directions so that the rotor 2 has the surface magnetic flux waveforms repeated of substantially zero (between the rotor magnetic poles 281)—S(High) (at the rotor magnetic pole 28)—substantially zero (between the rotor magnetic poles 211)—N(High) (at the rotor magnetic poles 21)—substantially zero (between the rotor magnetic poles 222).

Figure 4:
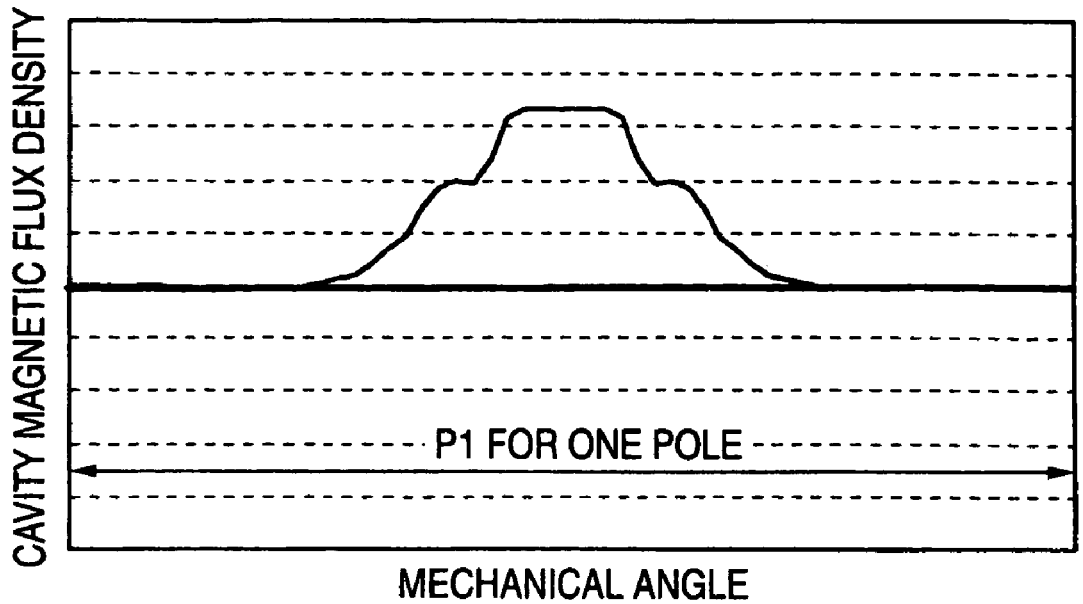
FIG. 4 is a graph for explaining the hybrid-excited rotating machine according to Mode of Embodiment 1 of the invention.
Figure 5:
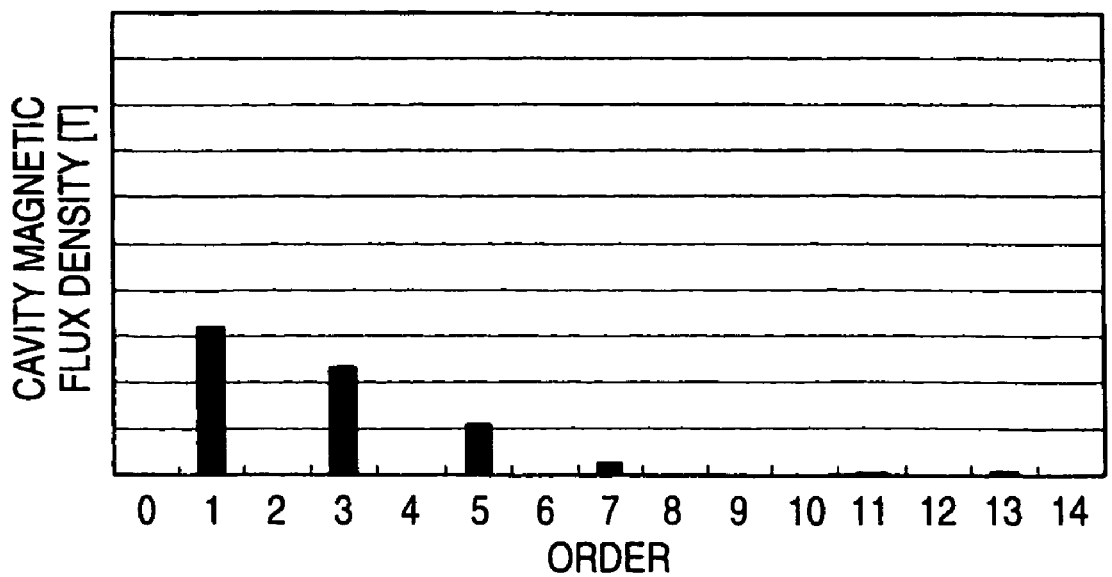
FIG. 5 is a graph for explaining the hybrid-excited rotating machine according to Mode of Embodiment 1 of the invention.

The air gap magnetic flux waveform, as determined by a magnetic field analysis of one pole P1 of a mechanical angle by the rotor magnetic pole 51 is shown in FIG. 4, and the spatial frequency analysis result is shown in FIG. 5. As apparent from FIG. 4, the air gap magnetic flux density is the highest at the circumferential center portion of the rotor magnetic pole 21, i.e., at the portion, in which the permanent magnet 51 is buried, and the air gap magnetic flux density becomes 0 in the spaces between the adjoining rotor magnetic poles on the iron core portions on the two sides. In the spatial frequency analysis results of this case, as shown in FIG. 5, there continue the fundamental wave components, the third higher harmonic components, the fifth higher harmonic components, the seventh higher harmonic components, and so on.

Figure 6:
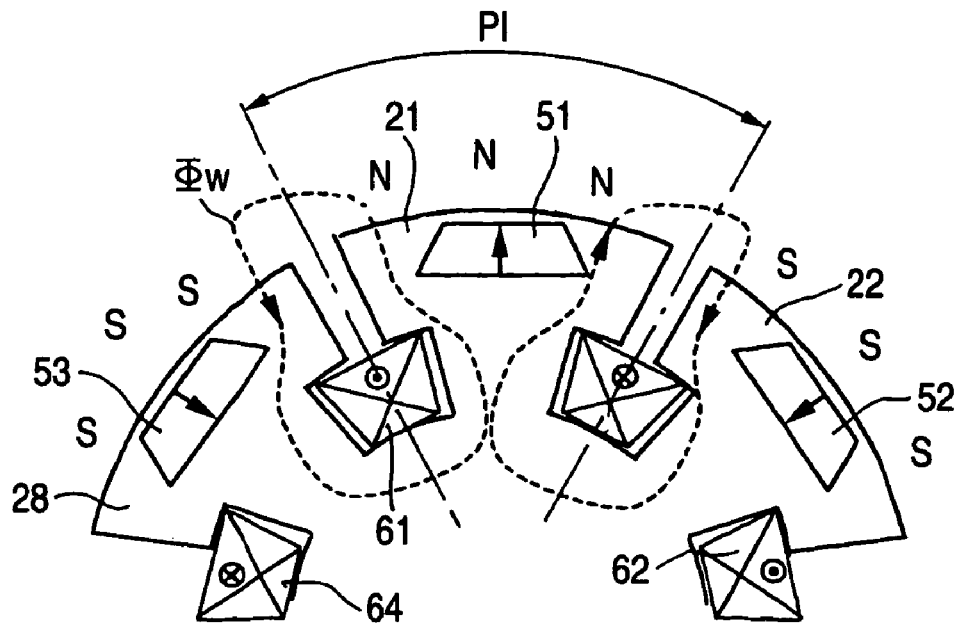
FIG. 6 is an explanatory diagram for explaining the hybrid-excited rotating machine according to Mode of Embodiment 1 of the invention.
Figure 7:
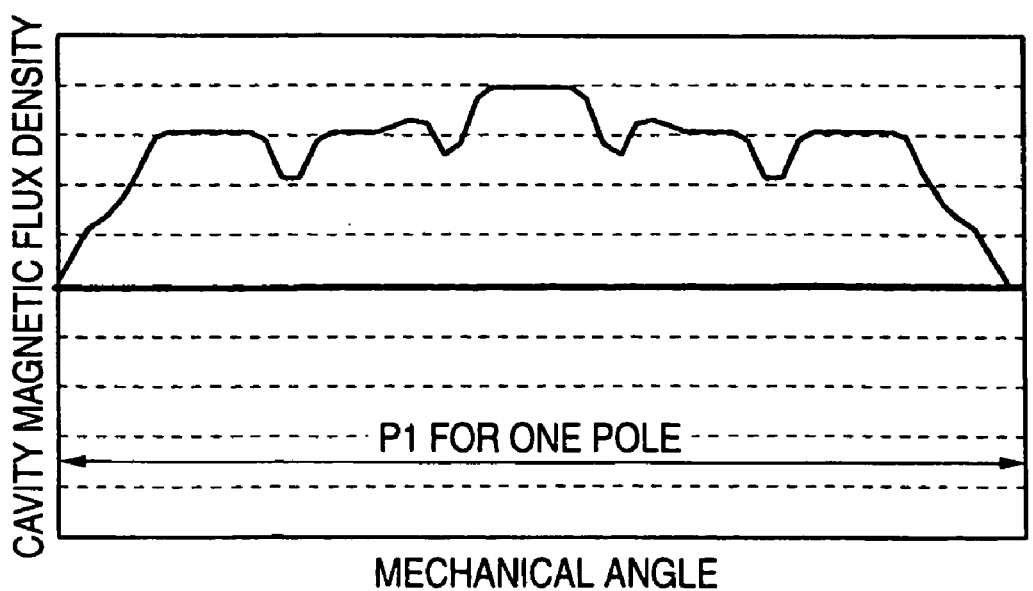
FIG. 7 is a graph for explaining the hybrid-excited rotating machine according to Mode of Embodiment 1 of the invention.
Figure 8:
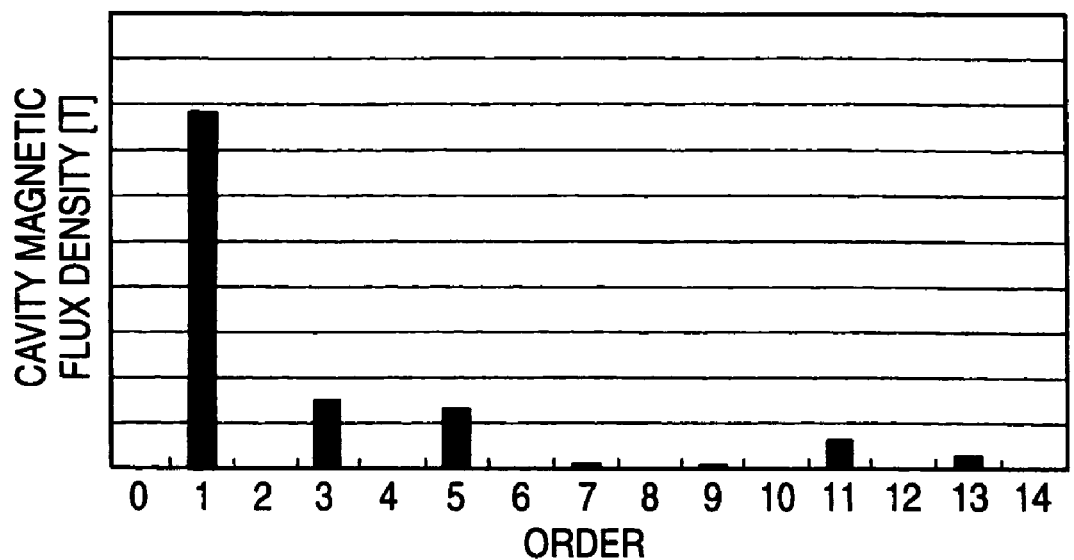
FIG. 8 is a graph for explaining the hybrid-excited rotating machine according to Mode of Embodiment 1 of the invention.

Here is described the case, in which an exciting current is fed to the field windings 61 to 64 in a direction to intensify the magnetic fluxes of the permanent magnets 51 to 58. As shown in FIG. 6, magnetic fluxes Φw by the individual field windings 61 to 64 are generated to cancel the magnetic fluxes at the two ends of the permanent magnets 51 to 58, so that the air gap magnetic flux of the one pole P1 of the mechanical angle takes a substantially sine wave, as shown in FIG. 7. Therefore, the surface magnetic flux waveforms of the rotor 2 repeat s (small)—S (large)—S (small)—N (small) N (large)—N (small). In this case, the spatial frequency analysis results are composed mainly of the fundamental wave components, as shown in FIG. 8, and partially of the third higher harmonic components, the fifth higher harmonic components and so on.

Figure 9:
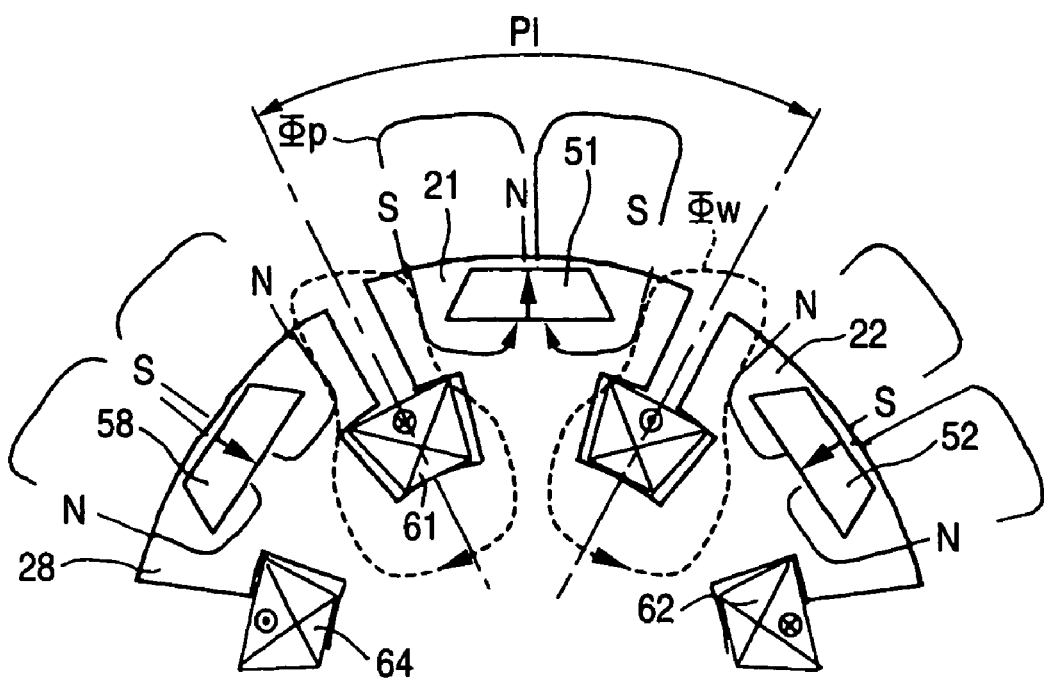
FIG. 9 is an explanatory diagram for explaining the hybrid-excited rotating machine according to Mode of Embodiment 1 of the invention.
Figure 10:
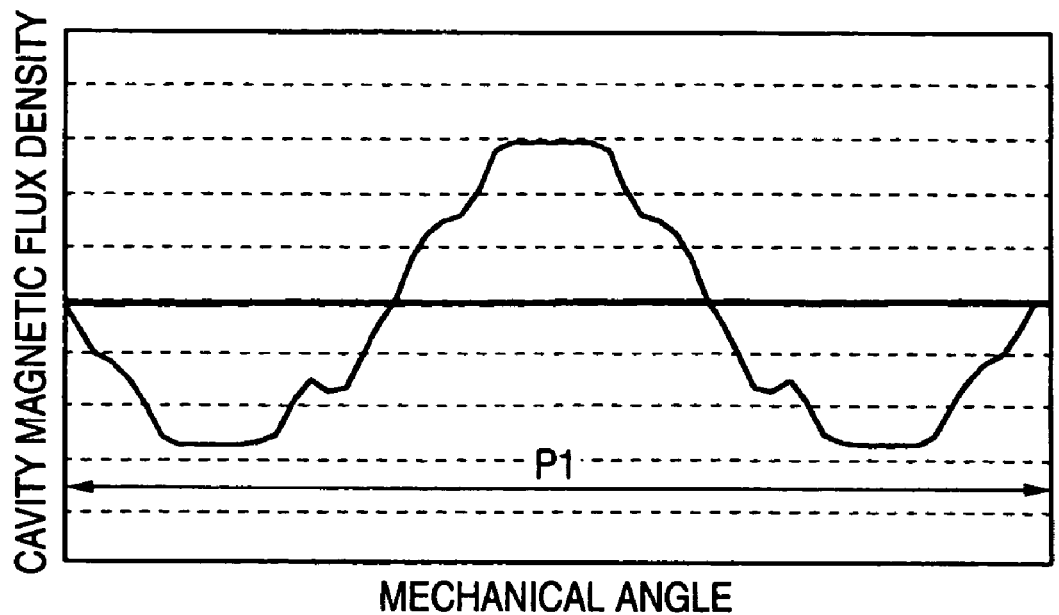
FIG. 10 is a graph for explaining the hybrid-excited rotating machine according to Mode of Embodiment 1 of the invention.

Here is described the case, in which the ON direction of the exciting current to the field windings 61 to 64 is inverted to weaken the magnetic flux of the permanent magnets 51 to 58 thereby to offset the fundamental wave components completely. In this case, the magnetic flux Φp by the permanent magnets 51 to 58 and the magnetic flux Φw by the field windings 61 to 64 are generated, as shown in FIG. 9. As a result, the S-poles are established on the surface of the rotor magnetic poles 21 located on the two sides of the permanent magnet 51, and the N-poles are established on the surface at the center portion where the permanent magnet 51 is located. The distribution of the air gap magnetic flux of the one pole P1 of the mechanical angle is shown in FIG. 10.

Figure 11:
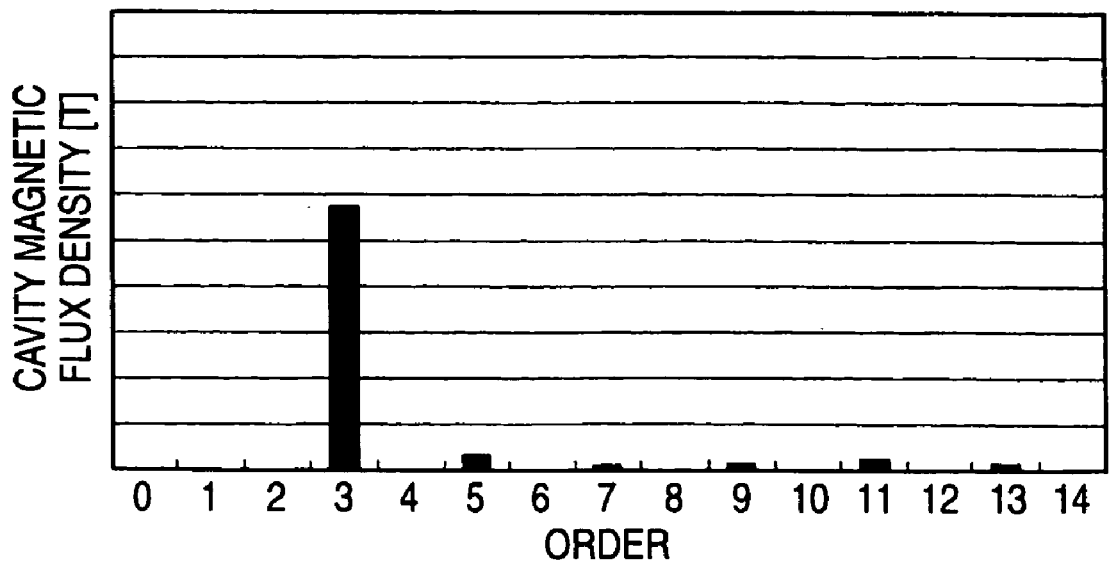
FIG. 11 is a graph for explaining the hybrid-excited rotating machine according to Mode of Embodiment 1 of the invention.
Figure 12:
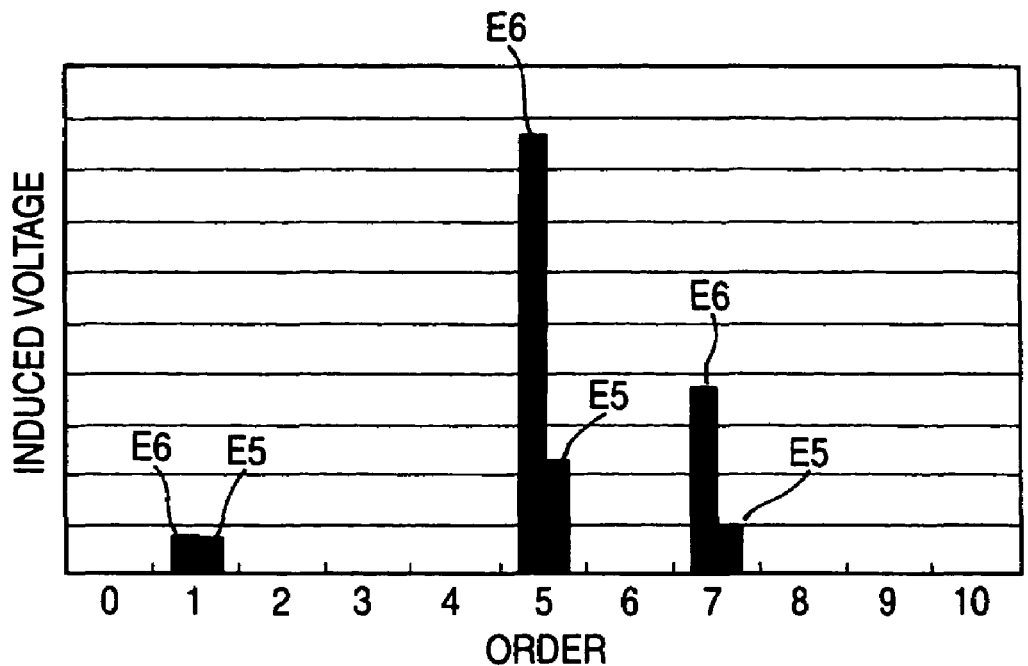
FIG. 12 is a graph for explaining the hybrid-excited rotating-machine according to Mode of Embodiment 1 of the invention.

In the spatial frequency analysis results of the aforementioned case, the fundamental wave components are completely offset, as shown in FIG. 11, substantially to only the third higher harmonic components. In Mode of Embodiment 1, however, the stator winding 12 is the three-phase Y-connection so that no potential difference occurs between the wires. In FIG. 11, the fifth higher harmonic components are slightly left. If the stator winding has every-pole/every-phase 2, the induced voltage of the fifth higher harmonic components can be reduced by making the winding pitch shorter to five slots than ordinary 6 slots (for one pole), that is, by making the winding pitch of the stator winding to as show as 84% (i.e., 5 slots/six slots). FIG. 12 shows the frequency analysis results of a dielectric voltage E5 at the time when the winding pitch of the stator winding 12 is 5 slots, and a dielectric voltage E6 for 6 slots. Thus, the inducing voltage of the higher harmonic components of the stator winding 12 can be lowered by the weak field control by the field windings.

According to Mode of Embodiment 1 of the invention, as has been described hereinbefore, the main magnetic flux can be changed, although the permanent magnets 51 to 58 act as the field poles, substantially from 0 to 1.3 to 1.5 times as large as that of the clawpole of the prior art. Under no load, the main magnetic flux is about 1.3 times as large as the clawpole of the prior art. Since the main magnetic flux can be changed substantially from 0, the generator is enabled, if so used, to control the power generation easily for the entire speed range by controlling the field current. On the other hand, the electric motor is enabled, if so used, to reduce the main magnetic flux substantially to 0, so that it can suppress the counter electromotive force thereby to generate the toque up to a high-speed rotation.

Moreover, the hybrid-excited rotating machine according to Mode of Embodiment 1 of the invention has a high salient-pole in the rotor so that it is effective for a high reluctance torque, as will be described in the following.

Figure 13:
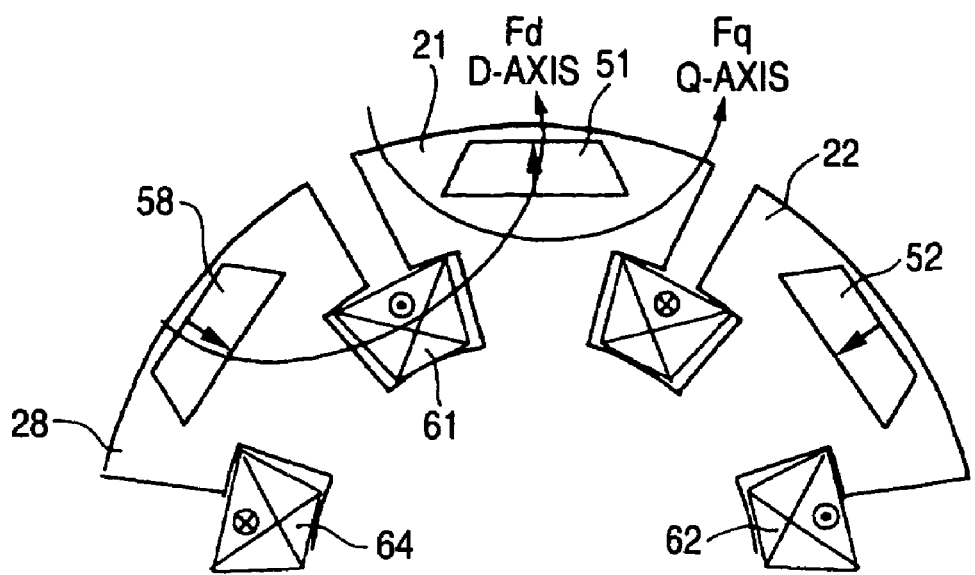
FIG. 13 is an explanatory diagram for explaining the hybrid-excited rotating machine according to Mode of Embodiment 1 of the invention.

In FIG. 13, arrows indicate a D-axis magnetic path Fd passing through the D-axis or the center axis of the rotor magnetic poles 21 to 28, and a Q-axis magnetic path Fq passing through the Q-axis or the center axis between the rotor magnetic poles. The permanent magnets 51 to 58 have a specific permeability of about 1, but the iron cores composing the rotor magnetic poles 21 to 28 have a specific permeability as high as 100 to 10,000. It is, therefore, possible to form the Q-axis magnetic path Fq for only the iron cores of the rotor magnetic poles 21 to 28 to pass, better than the D-axis magnetic path Fd for the permanent magnets 51 to 58 to pass.

It is generally known that the torque of the rotating machine having the salient-pole is expressed by the following Formula:

$$T=Pn\{(Ld-Lq)IdIq+\Phi aIq\} \quad \text{(Formula 1)},$$

Here, Pn: a number of pole pairs, Ld and Lq: a D-axis inductance and a Q-axis inductance, Id and Iq: a D-axis current and a Q-axis current of the case, in which the three-phase current is converted-into the two-phase one, and Φa: a magnetic flux to be established by the field windings and the permanent magnets.

In case the Q-axis inductance Lq is higher than the D-axis inductance Ld, the torque can be increased by advancing the phase difference angle of the ON current to the stator winding 12. By the weak field control thus using the stator, the torque is increased by applying the current −Id. The result of verification of the effects of the torque increase in this Mode of Embodiment 1 by the magnetic analysis is presented in FIG. 14.

Figure 14:
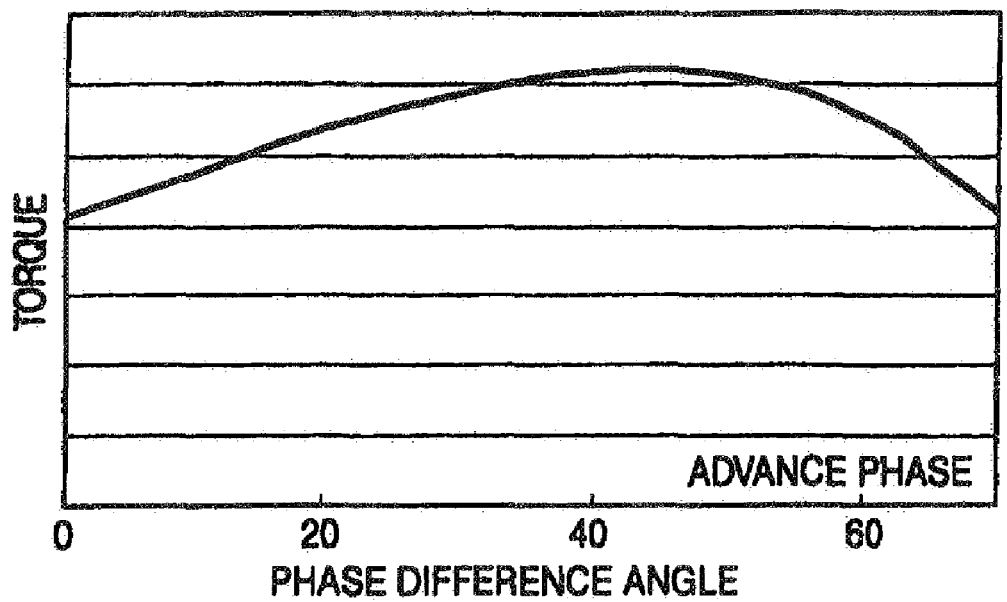
FIG. 14 is a graph for explaining the hybrid-excited rotating machine according to Mode of Embodiment 1 of the invention.

In FIG. 14, the abscissa indicates the phase difference angle of the ON current to the stator winding 12. FIG. 14 plots the relation of a torque against the advance phase angle (or electric angle) of the case, in which the position of the center of the magnetomotive force of the stator 1 is at 0 degrees and in which the power current to the stator winding 12 is advanced. As shown in FIG. 14, the torque can be increased about 1.5 times by advancing the ON current of the stator winding 12 by about 50 to 60 degrees in the electric angle. Thus, it is found that a rotating machine having a high torque can be provided in Mode of Embodiment 1 of the invention.

Moreover, the permanent magnets 51 to 58 used in Mode of Embodiment 1 are buried inside of the iron cores forming the rotor magnetic poles 21 to 28. As a result, the Q-axis magnetic flux flows to the iron cores existing on the air gap sides of the permanent magnets 51 to 58, so that the Q-axis inductance Lq can be increased to raise the torque and to enhance the effects of the weak fields.

Here, the permanent magnets 51 to 58 may be fixed on their two sides by wedge-shaped iron cores and exposed at their surfaces 5 to the air gap side. In this case, the surfaces of the permanent magnets are exposed to the air gap so that the peak of the main magnetic flux can become so high as to make the torque higher. Moreover, the permanent magnets 51 to 58 are arranged closer to the surface sides of the rotor magnetic poles 21 to 28. As a result, the iron core portions of the rotor magnetic poles 21 to 28 on the inner circumference side of the permanent magnets 51 to 58 become wider to facilitate the passage of the Q-axis magnetic flux thereby to enhance the effects of the weak field magnet.

According to the hybrid-excited rotating machine according to Mode of Embodiment 1, not the contribution of the permanent magnet is increased for the torque increase, but the reluctance torque, i.e., the magnetic salient-pole on the Q-axis (between the magnet poles) not on the D-axis (on the center of the magnet poles) is established so that the revolving structure can utilize the force to attract the salient-pole.

In the device of the prior art, the rotor magnetic poles have both the poles to be excited with the field windings and the poles to be excited with the permanent magnets. The poles having the permanent magnets have more or less salient poles but not at the winding position, so that the magnetic salient poles are not high when averaged in the entire of the rotor. In Mode of Embodiment 1 of the invention, however, the rotors are constituted such that their individual magnetic poles are formed generally into a section of T-shape in the direction orthogonal to the axis, such that the permanent magnets are mounted on the central portion in the circumferential direction, and such that iron cores to form the rotor magnetic poles are disposed on the two sides of the permanent magnets to enhance a permeability at both sides of the permanent magnets. As a result, the reactance is higher on the Q-axis than on the D-axis of the rotor magnetic poles so that the reluctance torque can be effectively utilized by giving the salient pole.

According to Mode of Embodiment 1 of the invention, the reluctance torque action can be highly utilized. In the case of a weak field control, the reluctance torque action can be highly utilized so that the effect of more torque of 30 to 50% than that of the D-axis current zero control can be attained by the weak field control.

According to Mode of Embodiment 1 of the invention, moreover, the main higher harmonic components to occur in case the magnetic flux is weakened by the field windings are tertiary so that no potential difference is established between the terminals by the combination with the Y-connection of the stator winding. Moreover, the fifth and seventh higher harmonic components of the induced voltage to occur as the terminal voltage can be further reduced by adopting the short pitch winding for the stator winding.

The rotor magnetic poles according to Mode of Embodiment 1 of the invention are repeatedly symmetric for every poles unlike the prior art so that the electromagnetic vibrating forces are so balanced at the individual poles as to produce no sound. Moreover, the distribution of mass is also symmetric with respect to the center so that the weight balance is so mechanically excellent as to cause no vibration.

It is ideal that the air gap magnetic flux in an AC machine has sinusoidal waveforms. According to Mode of Embodiment 1 of the invention, the magnetic flux distribution of the sinusoidal waveforms can be obtained by arranging the permanent magnets at the central portion of the rotor magnetic poles, which are required to have the highest magnetic flux density. The magnetic flux obtained by exciting the field windings may not have the peak of the sinusoidal magnetic flux density distribution, but the sinusoidal magnetic flux density distribution of a large amplitude in the air gap can be acquired even with the limited field current.

Mode of Embodiment 2

Figure 15:
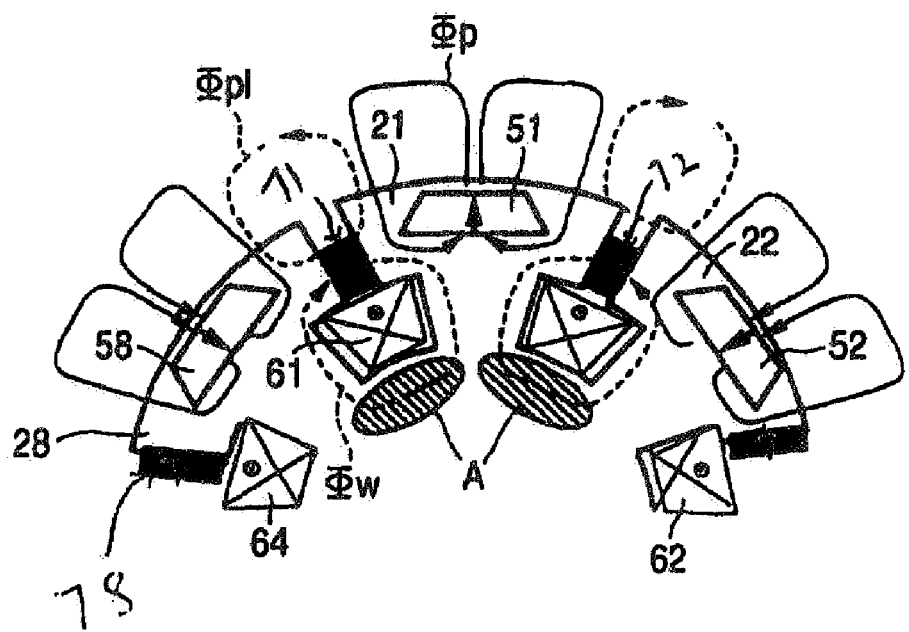
FIG. 15 is an explanatory diagram for explaining a hybrid-excited rotating machine according to Mode of Embodiment 2 of the invention.

FIG. 15 is an explanatory view showing a constitution of Mode of Embodiment 2 of the invention. In this Mode of Embodiment 2, as shown in FIG. 15, inter-pole permanent magnets 71 to 72 magnetized in the circumferential direction of the rotor are arranged between the individual rotor magnetic poles 21 to 28, i.e., between the inter-pole spaces. The inter-pole permanent magnets 71 to 78 have their magnetized directions alternately inverted.

According to this Mode of Embodiment 2, as shown in FIG. 15, the magnetic flux Φp1 according to the inter-pole permanent magnets 71 to 78 are added to intensify the magnetic flux so that the air gap magnetic flux density can be further enhanced. This magnetic flux is reversed in direction from the main magnetic flux Φp according to the permanent magnets 51 to 58 of the rotor magnetic poles 21 to 28, so that the center portion A of the rotor, as hatched in FIG. 15, can be relaxed in the magnetic saturation.

As a result, the diameter of the inner circumference of the iron core to form the rotor magnetic poles 21 to 28 of the rotor can be reduced to enlarge the winding area of the field windings 61 to 64. As a result, the field magnetomotive force can be increased to expect more increase in the main magnetic flux thereby to enlarge the starting torque and the output for the power generation at a low speed. Alternatively, the number turns of the stator winding 12 can be reduced, so that the motor output and the power output can be increased while leaving the starting torque as it is.

Mode of Embodiment 3

Mode of Embodiment 3 of the invention is a vehicle, in which the hybrid-excited rotating machine of Mode of Embodiment 1 or 2 is used as a generator driven for the power generation by the engine and as an electric motor for starting the engine.

Usually, the hybrid-excited rotating machine, as mounted on the vehicle, is used as the generator, when its rotor is driven by the vehicular engine, and as the electric motor when energized at its stator winding by the three-phase AC current. This rotating machine is used in the vehicle which has an engine mounted for an idling stop to improve the mileage. This vehicle is required to have a high starting torque in a low speed range for starting the engine quickly. At the same time, the output shaft has to be raised to the maximum rpm of 2,000 rev./min. and to ten times or more of the basic revolving speed. This makes it necessary to control the field of the motor weakly over a wide range.

In case the battery is connected with the stator winding of the rotating machine used as the generator so that the power is fed from the battery to another car-mounted device such as a radio or a light, it is necessary that the DC voltage at the two ends of the battery is not changed by the revolving speed of or the generating load on the engine.

The vehicle according to Mode of Embodiment 3 of the invention has the high starting torque, as described before, and performs the weak field control using the field windings or the rotor windings, so that the main magnetic flux can be smoothly varied from substantially zero to the maximum quantity and fed to the battery or the car-mounted electric load. Thus, the vehicular rotating machine can control the DC voltage and acquire a high generation output over a wide revolving speed range.

The power feed to the field windings of the rotor is performed through the slip ring by the brush. In case the current value of the brush current has an upper limit, the field magnetomotive force is restricted by the number of turns of the field windings for the limited winding space. If a high starting torque is desired, on the other hand, the motor has to be designed to have many poles and accordingly a larger internal diameter for the armature. The practical number of poles needed is eight or more.

Figure 16:
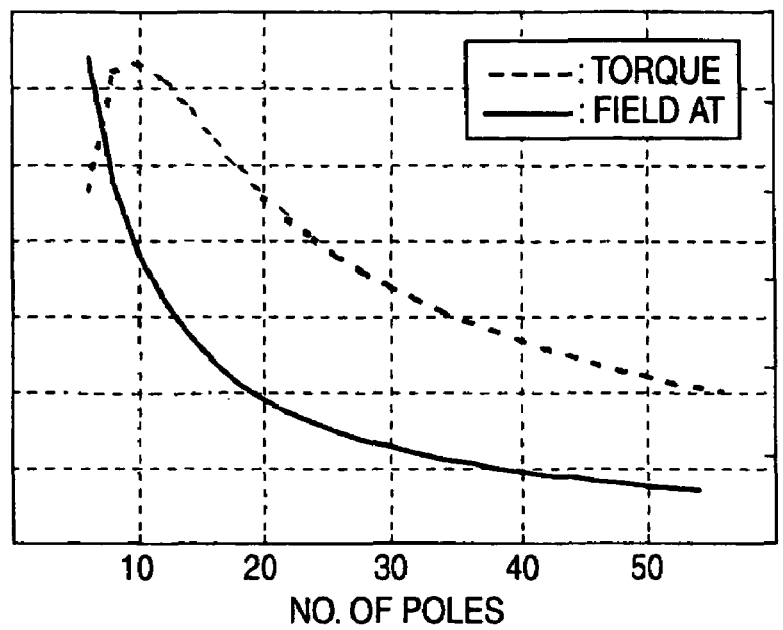
FIG. 16 is a graph for explaining a vehicle equipped with a hybrid-excited rotating machine according to Mode of Embodiment 3 of the invention.

In the multi-pole rotating machine having field windings at individual poles, as shown in FIG. 16, the winding space for the field windings of every poles is reduced to decrease the number of field windings, so that the field magnetomotive force is lowered to raise a problem that the magnetic flux variable decreases. In FIG. 16, the abscissa indicates the number of poles, and a solid curve plots the field ampere turns whereas a broken curve plots the torque. From FIG. 16, it is found that the desired number of poles is about 8 to 20. In Mode of Embodiment 3, therefore, the range of application is desired to be 8 to 20 poles.

According to the structure of the rotating machine of the invention, even with so many poles, the permanent magnets are used at the polar center portion of the maximum magnetic flux density, thereby to control the magnetic flux at the two end portions of the core magnetic poles, where the magnetic flux might otherwise be changed by the relatively small magnetomotive force. By this multi-polarization, therefore, the magnetomotive force per pole may be small and can acquire the sinusoidal magnetic field necessary for the high starting torque while suppressing the heat generation of the field.

Even in case the field windings of the rotor are energized in reverse directions and oppositely magnetized, the magnetic flux to occur in the field windings in the opposite direction to the permanent magnets passes through the iron core portions at the two ends having no permanent magnet of the rotor magnetic poles, so that the permanent magnets are not demagnetized. According to the vehicle of Mode of Embodiment 3, therefore, the rare earth permanent magnets, which might otherwise be easily demagnetized at a high temperature, are used as the rotor magnetic poles. The hybrid-excited rotating machine according to Mode of Embodiment 3 is characterized in that the temperature rise of the rotor due to the heat liberation of the field windings of multiple poles is lowered so that the thermal demagnetization is hardly caused by feeding the power backward to the field windings. As a result, the rotating machine has its performance hardly degraded by the heat, even if it is disposed under a high-temperature environment such as the engine room.

Mode of Embodiment 4

Figure 17:
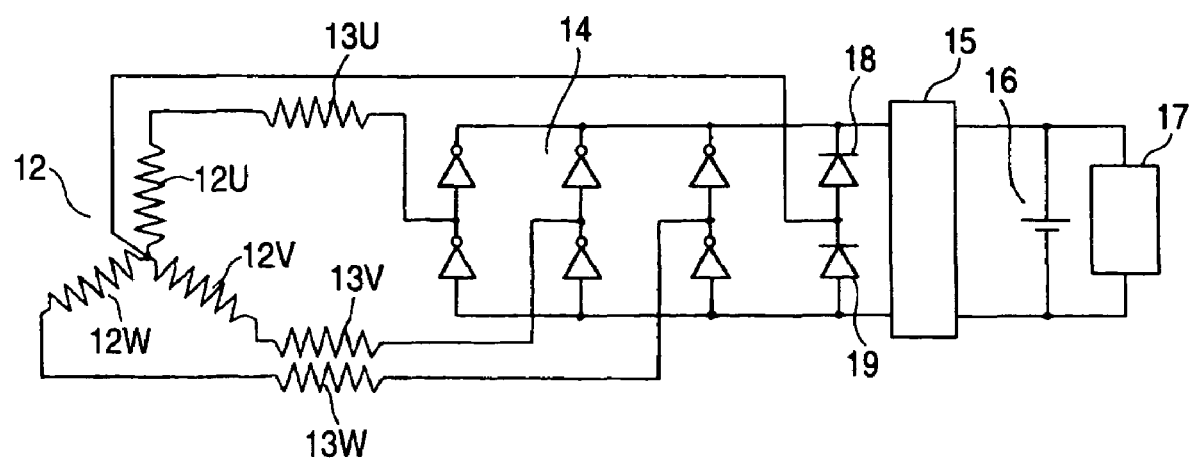
FIG. 17 is an explanatory diagram showing a circuit of a stator winding according to Mode of Embodiment 4 of the invention.

FIG. 17 is an explanatory diagram showing a circuit of the stator winding 12 of the hybrid-excited rotating machine according to Mode of Embodiment 4 of the invention. In this Mode of Embodiment 4, a series connector of semiconductor elements 18 and 19 or diodes is connected with the output side of the power converter 14, and the series connection of those semiconductor elements 18 and 19 is connected with the neutral point of the stator winding 12 having the three-phase Y-connection. Therefore, the battery 16 is connected with the neutral point of the stator winding 12 through the semiconductor elements 18 and 19 and the voltage regulator 15.

According to the hybrid-excited rotating machine of Mode of Embodiment 4, there is added the series connector of the semiconductor elements 18 and 19, through which the neutral point of the stator winding 12 is connected with the battery 16. The tertiary higher harmonic components, as generated by the stator winding 12, are effectively used for charging the battery 16.

Usually in case the rotating machine mounted on the vehicle is used as the generator, the generation characteristics are saturated by the magnetic saturation of the rotor as the engine speed rises. According to Mode of Embodiment 4, however, the neutral point of the stator winding 12 is connected with the semiconductor elements 18 and 19. In the high-speed rotation range, therefore, the electric current flows to relax the magnetic saturation of the rotor so that the third higher harmonic components are liable to occur. As a result, the magnetic saturation of the rotor in the high-speed rotation range is highly relaxed to relax the power generation characteristics.

Figure 18:
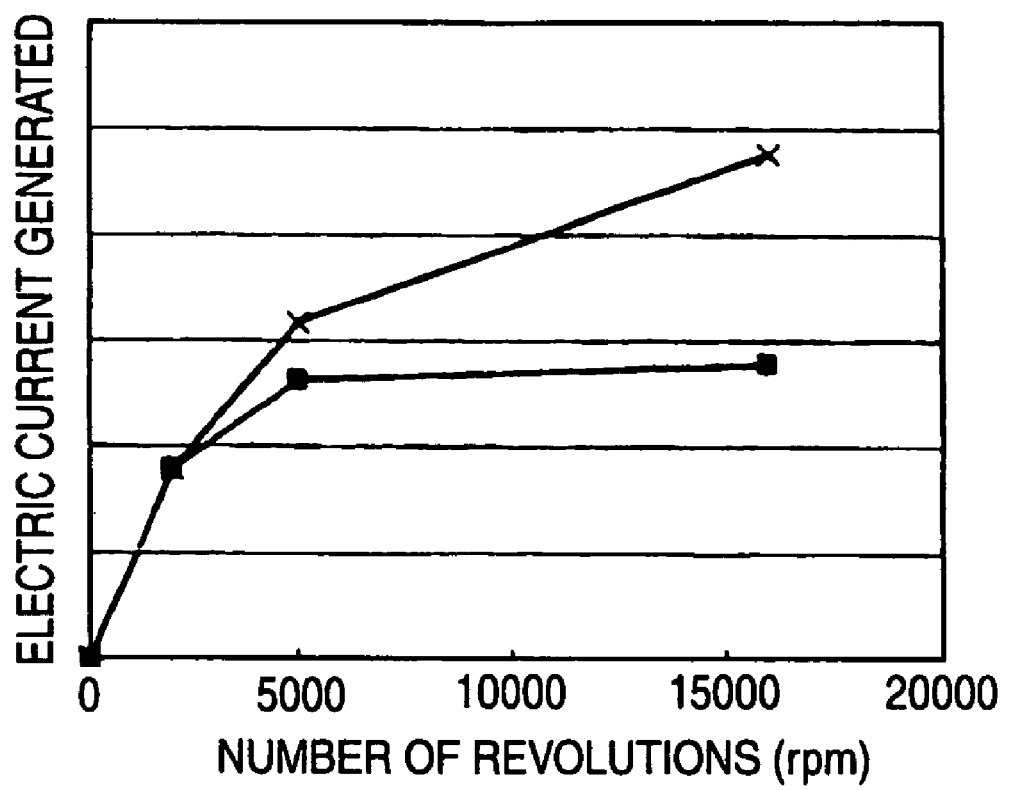
FIG. 18 is a graph for explaining the hybrid-excited rotating machine according to Mode of Embodiment 4 of the invention.

FIG. 18 is a graph for comparing the characteristics of electric currents generated, between the case of Mode of Embodiment 4, in which the circuit for connecting the semiconductor elements 18 and 19 and the neutral point of the stator winding 12 is added, and the case, in which the circuit is not added.

As apparent from FIG. 18, it is found that the saturation of the generation characteristics is highly relaxed in Mode of Embodiment 4.

What is claimed is:

1. A hybrid-excited rotating machine comprising:
   a stator having a stator winding of a multiphase Y-connection;
   a plurality of rotor magnetic poles fixed on a rotor shaft at a predetermined spacing in the circumferential direction and confronting the inner circumference of said stator through an air gap;
   a plurality of permanent magnets fixed at substantially central portions of said circumferential direction of all of said rotor magnetic poles and magnetized in the radial direction of said rotor shaft; and
   a plurality of field windings wound individually on all of said rotor magnetic poles,
   wherein each of said permanent magnets fixed at each of said rotor magnetic poles is magnetized in a direction opposite to the direction in which said permanent magnet fixed on an adjacent rotor magnetic pole is magnetized,
   wherein, in the case where said plurality of field windings are biased in a first predetermined direction, each said rotor magnetic pole has a single polarity, which corresponds to a polarity of said permanent magnet fixed at a substantially central portion of said rotor magnetic pole, due to an interaction between the magnetic flux generated by said biased field winding and the magnetic flux generated by said fixed permanent magnet, and
   wherein, in the case where said plurality of field windings are biased in a direction opposite to said first predetermined direction, each said rotor magnetic pole has a first polarity corresponding to the polarity of said fixed permanent magnet and second and third respective polarities that flank said first polarity, wherein the second and third polarities are opposite to said first polarity, due to an interaction between the magnetic flux generated by said reversely biased field winding and the magnetic flux generated by said fixed permanent magnet.

2. A hybrid-excited rotating machine according to claim 1, wherein said permanent magnets are buried in said rotor magnetic poles.

3. A hybrid-excited rotating machine according to claim 1, wherein said permanent magnets are inserted in grooves formed in said rotor magnetic poles and have their surfaces exposed to said air gap.

4. A hybrid-excited rotating machine according to claim 1, further comprising inter-pole permanent magnets interposed between all of said rotor magnetic poles and magnetized in said circumferential direction.

5. A hybrid-excited rotating machine according to claim 1, wherein said stator winding is a fractional-pitch winding having a winding pitch as short as 84% of a pole pitch.

6. A hybrid-excited rotating machine according to claim 1, wherein said stator winding is made of a three-phase or six-phase Y-connection winding, wherein said rotor magnetic poles have at least eight poles, and wherein said permanent magnets are made of a material containing rare earth elements.

7. A hybrid-excited rotating machine according to claim 1, wherein said stator winding is connected at its neutral point with a battery through a semiconductor element.

8. A vehicle comprising a hybrid-excited rotating machine according to claim 1, wherein said hybrid-excited rotating machine is used as a generator to be driven by an engine of a vehicle and as an engine staffing motor for starting said engine.

* * * * *